United States Patent [19]

Anderson, Jr. et al.

[11] Patent Number: 4,504,007
[45] Date of Patent: Mar. 12, 1985

[54] SOLDER AND BRAZE FLUXES AND PROCESSES FOR USING THE SAME

[75] Inventors: Herbert R. Anderson, Jr., Patterson; Constance J. Araps; Richard A. Bates, both of Wappingers Falls, all of N.Y.

[73] Assignee: International Business Machines Corporation, Armonk, N.Y.

[21] Appl. No.: 417,966

[22] Filed: Sep. 14, 1982

[51] Int. Cl.³ .............................................. B23K 35/36
[52] U.S. Cl. .................................... 228/123; 228/220; 228/224; 228/248; 75/23; 75/24
[58] Field of Search ............... 228/223, 224, 123, 208, 228/219, 220, 221, 248; 148/23, 24, 25

[56] References Cited

U.S. PATENT DOCUMENTS

| | | | |
|---|---|---|---|
| 2,429,033 | 10/1947 | Silman et al. | 148/25 |
| 2,566,339 | 9/1951 | Klinker | 148/24 X |
| 2,664,370 | 12/1953 | Snell et al. | 148/23 |
| 2,908,072 | 10/1959 | Johnson | 228/248 X |
| 3,040,781 | 6/1962 | Reymann et al. | |
| 3,281,222 | 10/1966 | Bouton et al. | |
| 3,294,951 | 12/1966 | Olson | 29/831 |
| 3,448,512 | 6/1969 | Saba | |
| 3,495,322 | 2/1970 | Goldstein | 228/123 |
| 3,620,799 | 11/1971 | Hoelscher | 228/208 |
| 3,697,333 | 10/1972 | Hoeffleur | 148/24 |
| 3,791,027 | 2/1974 | Angelo et al. | 148/23 X |
| 3,832,242 | 8/1974 | Cuthbert | 148/24 |
| 3,986,899 | 10/1976 | Kole et al. | 148/24 |
| 4,194,931 | 3/1980 | Zado | 228/223 X |
| 4,216,035 | 8/1980 | Bakos et al. | 148/23 |
| 4,221,047 | 9/1980 | Narken et al. | 29/840 |
| 4,243,440 | 1/1981 | Arbib et al. | 148/23 |
| 4,268,585 | 5/1981 | Daur et al. | 228/180 A |
| 4,342,606 | 8/1982 | Notton | 148/23 |

OTHER PUBLICATIONS

*IBM Technical Disclosure Bulletin*, vol. 21, No. 8, Jan., 1979, pp. 3118-3119; No. 9, Feb., 1979, p. 3590.
*IBM Technical Disclosure Bulletin*, vol. 22, No. 2, Jul., 1979, pp. 541-542.
*IBM Technical Disclosure Bulletin*, vol. 23, No. 7A, Dec., 1980, p. 2852.
Krevelen et al., *Properties of Polymers*, Elsevier Scientific Publishing Co., New York, 1976.
Grassie, N., *Chemistry of High Polymer Degradation Processes*, University Microfilms, Ltd., Ann Arbor, Michigan, contents and pp. 1-24 only.

*Primary Examiner*—Kenneth J. Ramsey
*Attorney, Agent, or Firm*—Sughrue, Mion, Zinn, Macpeak and Seas

[57] ABSTRACT

In a soldering process for joining a plurality of metal components wherein a flux is employed to promote the process, the improvement comprises using as a flux in the process a flux consisting essentially of dihydroabietyl alcohol or dihydroabietyl alcohol and a member selected from the group consisting of a thermally depolymerizable polymer or a mixture of thermally depolymerizable polymers having the structure:

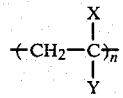

where X and Y are n-alkyl and iso-alkyl not exceeding 6 carbon atoms; halogen; —COOR where R is n-alkyl and iso-alkyl not exceeding 6 carbon atoms; phenyl, naphthyl, tolyl and methyl-naphthyl groups; n is 5 to 500, and mixtures thereof.

13 Claims, No Drawings

SOLDER AND BRAZE FLUXES AND PROCESSES FOR USING THE SAME

BACKGROUND OF THE INVENTION

The present invention relates to solder and braze fluxes and processes for utilizing the same.

DESCRIPTION OF THE PRIOR ART

As is known, a flux is used in soldering to remove metallic oxides on the surfaces of metals to be joined and to promote wetting of the metals.

Known fluxes include organic and inorganic fluxes. Mineral acids, reducing atmospheres and halogenated salts are typical inorganic flux constituents for activated fluxes. Rosin and organic acids are typical organic flux constituents for non-activated fluxes.

Soldering is generally considered a low temperature process to join a metal to a metal.

In distinction, brazing is generally considered a higher temperature process to join a metal to a metal, typically involving temperatures on the order of 300° to 450° C. or higher. However, there are processes where those skilled in the art can classify the same as soldering processes or brazing processes, depending upon the temperature involved.

There are many texts which deal with the highly developed art of soldering and brazing, disclosing equipment useful therefor, metals which can be soldered or brazed and soldering and brazing filling materials. See especially Kirk and Othmer Encyclopedia, Vol. 18, pages 541 through 548 published by McGraw-Hill in 1971; Brazing Manual, published by the American Welding Society, 1963; Specification for Brazing Filler Metal published by the American Welding Society, 1969, and the Welding and Brazing section of the Metal Handbook, 8th Edition, Vol. 6, published by the American Society for Metals, 1971. Such are hereby incorporated by reference.

Certain representative prior art is briefly discussed below.

Typical references disclosing activated rosin based fluxes which are subject to the inherent disadvantages of rosin fluxes, i.e., decomposition and polymerization, charring, generation of insoluble residues, etc., include: U.S. Pat. Nos. 2,700,628; 3,281,222; 3,448,512; 3,832,242; 4,194,931; 2,429,033; and 2,664,370.

Certain patents disclose the use of polymers as additives to fluxes but do not attach any solder wetting or fluxing capability to the polymers, rather, the polymers are added to improve adhesive properties (U.S. Pat. No. 3,697,333) or physical properties when the composition is used as a combined passivating film and flux (U.S. Pat. Nos. 4,243,440 and 4,216,035). Such compositions are rosin based and suffer from the problems earlier mentioned.

U.S. Pat. No. 3,040,781 discloses a solderable, protective coating of acrylate and methacrylate copolymers. The disclosed flux is predicated on a chemical reaction between the decomposed flux and the solder. Such a polymer would decompose to yield a complex mixture of acid and ester compounds, would not "unzip" cleanly to yield monomers and would leave a considerable residue which would char. Activating agents are also present.

U.S. Pat. No. 3,791,027 discloses the use of reactive polymer resins and other compounds as soldering fluxes which are designed to react chemically with metal oxides present to generate hydrogen which serves as a reducing agent. Although polyisobutylene is disclosed, it is always "functionalized" to render the same reactive, in distinction to the non-reactive polyisobutylene of the present invention.

Polymers are known which undergo thermal degradation, called "unzipping". Many of such polymers are disclosed in Properties of Polymers, D. W. Van Krevelen et al, Elsevier Scientific Publishing Co., New York, 1976, and Chemistry of High Polymer Degradation Processes, N. Grassie, published on demand by University Microfilms, Ltd., Ann Arbor, Mich., U.S.A. Both of these publication are hereby incorporated by reference.

IBM Technical Disclosure Bulletin Vol. 22, No. 2, July, 1979, page 542, discloses "unzippable" polymers for use in green sheets where the unzippable polymer serves as a binder for a powdered ceramic material. There is no disclosure in this document of using unzippable polymers as a solder or braze flux.

IBM Technical Disclosure Bulletin, Vol. 22, No. 2 July 1979, page 541 discloses the use of gamma radiation to enhance the unzipping of poly(alpha-methylstyrene) which is used as a binder to form green sheets, a plurality of which are laminated together to form a multilayer ceramic substrate. No disclosure occurs therein, however, of use in a solder or braze flux.

It is to be specifically noted that all soldering and brazing fluxes used to date are predicated upon the belief that the fluxes are reacted with the metal substrate(s) being soldered or brazed and/or the solder itself. As will be discussed later in detail, the present invention is directly contrary.

Few commercial activated fluxes are suitable for use in electronic applications because they contain or generate inorganic acids, inorganic salts or halogens, which leave residues that are difficult or impossible to remove, and result in corrosion and/or poor electrical performance.

Rosin based solder or braze fluxes are most preferred for use in electronic soldering and brazing applications because of their relatively mild, non-corrosive action.

However, such fluxes are undesirable for the following reasons:

Rosin, being a natural product obtained from pine trees, is a complex mixture of abietic-type acids and abietic and fatty acid esters, alcohols and acetates. Accordingly, it is not feasible to assay or control the purity of rosin.

Most rosin consitutents are unstable in air and oxidize and polymerize on heating, resulting in a charred, resinous residue (12–16%). The charred or polymerized portion of the residue cannot be removed completely using solvents, and about 0.6% remains after cleaning with toluene and isopropanol. Flux residues are undesirable because they have been associated with metal corrosion and reduction in the capacity of the fluxed metal to properly dissipate heat.

SUMMARY OF THE INVENTION

The present invention provides a new class of chemically unreactive fluxes for use in solder and brazing processes.

The fluxes of the present invention comprise thermally stable, high boiling point monomeric organic compounds and/or thermally depolymerizable polymers. The high boiling monomeric organic compounds distill without undergoing any chemical change, or reacting chemically in situ so as to leave a residue and the thermally depolymerizable polymers depolymerize, and, accordingly, also leave no residue upon the completion of soldering or brazing. Further, neither materials contribute in any way to corrosion.

DESCRIPTION OF PREFERRED EMBODIMENTS

Hereafter, the term "flux" is used to generically refer to solder and braze fluxes, unless otherwise indicated and all percents (%) and parts are by weight, unless otherwise indicated.

The fluxes of the present invention are nonreactive, as opposed to prior art fluxes, which are reactive.

The fluxes of the present invention are also superior to conventional prior art fluxes such as rosin in the following respects:

They are as effective or more effective in soldering to various materials, e.g., nickel, gold or tin surfaces or brazing of various powders, e.g., gold or gold-tin powders.

They are readily purified and characterized and, accordingly, more consistently formulated.

They are more stable to oxidation and polymerization and, accordingly, should have a significantly extended shelf life.

They are thermally purged from the molten solder or brazing during heating, resulting in flux-free metallurgy upon cooling, whereas rosin fluxed samples result in metallurgy with residual flux inclusions which structurally weaken the solder or braze joint.

A further benefit from the fluxes of the present invention is that they do not leave any residue. The lack of surface residue results in the elimination of any post-joining cleaning process. Under no circumstances have the fluxes of the present invention been found to leave char as is the case with rosin.

One major benefit of the present invention is that as the present invention is based upon a physical approach, not a reactive approach, it is of wide use with many different types of solders, brazes and substrates which are to be soldered or brazed.

Expanding upon this point, it is well known that during soldering or brazing the solder or braze must melt, and the substrate which is being soldered or brazed must be clean, i.e., oxide free. However, on a practical level it is essentially impossible to completely remove such oxide.

Per the present invention, as the solder is heated up (convection and/or microwave), it has been discovered that the coefficient of expansion of the oxide layer present on the metal substrate is lower than the coefficient of expansion of the metal substrate. Accordingly, per the present invention the expanding metal under the oxide results in microcracks in the oxide and the flux of the present invention penetrates the microcracks and wets the exposed high surface energy metal substrate to be soldered or brazed, and also further promotes sloughing off of the undesired metal oxide. The liquid flux also serves to prevent any (re)oxidation of molten solder or molten braze during processing. The relationship between the flux distillation point and/or depolymerization point and the melting point of the solder or braze is later discussed in more detail.

With respect to the thickness of the oxide on the metal substrate to soldered or brazed, the fluxes of the present invention are of general application with oxide layers as have been soldered or brazed in the art, e.g., those which are only a few angstroms thick, e.g., 10 angstroms, to very thick oxide layers, e.g., oxide layers which are on the order of 200 to 400 angstroms thick, typically considered "heavily oxidized" in the art. However, in every instance the mechanism of the flux of the present invention is a physical mechanism, and does not involve a chemical reaction.

Thus, the present invention is of use with solders and brazes as are known in the prior art, so long as the solder can be melted and the flux of the present invention is a fluid at the temperature of solder melting. Examples of such solders include lead-tin solders, gold-tin solders, lead-indium solders, lead-bismuth solders, silver solders and the like, with preferred lead-based solders containing 60–95% lead, balance other components. Other solders contemplated as useful include 50 lead-32 tin-18 cadmium, 57 bismuth-43 tin, 95 lead-2 antimony-3 tin and the like.

Brazes useful in the present invention are merely subject to the same limitations as solders useful in the present invention as above discussed, and again there is essentially no limit on the nature of the brazes which can be used per the present invention so long as the braze will melt and the flux of the present invention is a fluid at the melting temperature.

Useful brazes typically have as a principle constituent copper, silver, nickel, cadmium and/or zinc. Often copper is used alone or the same may be doped with small proportions of phosphorus, silicon, manganese or aluminum. A most highly preferred braze for use in the present invention for electronic applications is a gold-tin braze. Other brazing alloys contemplated as useful in the present invention are disclosed in U.S. Pat. No. 3,832,242 as Col. 2, line 9 to Col. 2, line 64, which disclosure is hereby incorporated by reference.

Brazes useful in the present invention also include those described in IBM Technical Disclosure Bulletin, Vol. 21, No. 8, January 1979, page 3118, of the gold-/tin/silver type, proportions being disclosed therein, those disclosed in IBM Technical Disclosure Bulletin, Vol. 21, No. 9, February 1979, page 3590 of the gold-/tin/silver and gold/tin/palladium type, proportions being given therein, those disclosed in IBM Technical Disclosure Bulletin, Vol. 21, No. 8, January 1979, page 3119, of the gold/tin/silver type, with proportions being disclosed therein, and the like, all of these IBM Technical Disclosure Bulletins being hereby incorporated by reference.

Solders useful in combination with the flux of the present invention are not limited in physical form and can be, for example, of the core type, can be vapor deposited in patterns or can be subjected to laser joining.

The physical form of the brazes used in combination with the flux of the present invention is also not limited in any substantial fashion, though brazes are generally used in paste form so that the metal substrates in contact are both in intimate contact with the paste, the flux of the present invention serving as the binder for the paste. In this regard, the braze particles in the paste, typically a gold/tin alloy wich is mostly gold, are not restricted in particle size, and particle sizes as are typically used in the art are used with success per the present invention. Proportions of flux and solvent are similar to those used in the prior art, e.g., generally up to about 30 to 40 weight percent flux plus solvent based on the braze weight, more commonly on the order of 5 to 10 weight percent, same basis.

With both solders and brazes there are no restrictions as to the method of flux application.

The metal substrates which can be soldered or brazed per the present invention are not limited and include those which can be joined by soldering or brazing methods known in the art, e.g., copper, brass, nickel, iron, zinc, alloys thereof and the like. The only restriction on the metal substrate soldered or brazed per the present invention is that it must, of course, be wettable. In electronic applications, probably the most common metal substrates soldered or brazed are nickel coated molybdenum, nickel, nickel-gold alloys, gold and pre-tinned surfaces, all of which are highly wettable.

Thus, for example, the fluxes of the present invention can be used to join an integrated circuit component, e.g., via contact pins thereon, to complementary contact areas on an inorganic or organic carrier, e.g., an alumina substrate with nickel coated molybdenum metallurgy.

Turning now to the flux of the present invention in more detail, the flux of the present invention contains one or more thermally stable, high boiling point monomeric organic compounds and/or one or more thermally depolymerizable polymers (hereinafter often merely TDP for brevity). Further, though referenced to in the singular, it should be understood one or more of such components can be used.

The high boiling point monomeric organic compound distills without undergoing any chemical change, or reacting chemically in situ so as to leave a residue, and the low molecular weight, thermally depolymerizable polymer depolymerizes at the temperature of soldering or brazing without decomposition to yield volatile, monomeric by-products and, accordingly, without leaving a residue, even if the same are used in combination with a solvent as later described. In distinction to the prior art, no activators or other additives need be present in the flux of the present invention for its successful use.

While the subsequent discussion of preferred high boiling point compounds and TDPs is in the context of preferred embodiments of the present invention, it must be appreciated that there are certain generic criteria which will enable one skilled in the art to select operable high boiling point monomeric organic compounds and TDPs and utilize the same in the present invention, as are now discussed.

The fluxes of the present invention do not decompose to yield a residue as is the case with rosin, presumably due to the formation of thermoset polymers. Of course, substantial impurities should not be present in the fluxes of the present invention which might leave a residue.

They have a vapor pressure (or depolymerization temperature) such that they vaporize or depolymerize at the desired temperature.

They have a viscosity such that they exhibit suitable flow properties when heated.

They have a surface tension such that they readily wet the materials to be soldered, e.g., they exhibit a contact angle $\phi$ less than about 40°, typically 20°–40°.

Thus, per the present invention high boiling point monomeric organic compounds are used which are liquid at the temperature of soldering or brazing and which, accordingly, distill off from the solder as a gas. They can be selected to match the heating rate requirements of individual joining processes.

On the other hand, the TDPs of the present invention exhibit the capability of direct transformation into the gas phase at the completion of soldering. This is essentially equivalent to sublimation, i.e., the depolymerization results in conversion of the TDPs into monomeric materials which do not pass through the liquid phase.

In this regard, as will be apparent to one skilled in the art and has been earlier emphasized, the flux of the present invention must be fluid at soldering or brazing to effect the cleaning/protective actions earlier mentioned.

The high boiling point monomeric organic compounds used are, of course, inherently liquid.

The TDPs, however, in many instances have a molecular weight such that they are not per se fluid at the initiation of soldering or brazing. Accordingly, in such case a TDP per the present invention is generally used in combination with one or more solvents and/or one or more high boiling point monomeric organic compounds. Essentially, the TDP is dissolved in the solvent or the high boiling point monomeric organic compound, the latter basically functioning as a plasticizer. Since solvents and/or high boiling point monomeric organic compounds are essentially evaporated prior to TDPs per the present invention, the solvent(s) and/or high boiling point monomeric organic compound(s) when used with one or more TDPs serve the basic function of acting as a vehicle for TDP application. Upon reflow when the flux is in the fluid state, after the one or more solvents and/or high boiling point monomeric organic compounds are evaporated off the one or more TDPs present essentially revert to their solid state, whereafter depolymerizaton results. While we suspect that some solvent and/or high boiling monomeric organic compound may be retained in the TDP polymer network after the completion of evaporation thereof, we have found this has no substantial inhibiting effect on the depolymerization of the TDP.

At the time of soldering the solder/flux/metal substrate are in a condition of high turbulence, i.e., the solder is molten and, due to the temperature differential creating turbulence, the flux is permitted to mix into the interior of the solder and contact the exposed metal due to oxide microcracking as earlier indicated, whereafter the flux will constantly vaporize or depolymerize and escape from the solder or braze. The fluxes of the present invention thus purge the interior of the solder or braze and the metal substrate in such a fashion that the strength of the joint is increased and the number of defects are lowered.

Of course, as will be implicit in the above discussion, wetting of the metal substrate occurs well prior to flux elimination by vaporization as above discussed. For example, with a 95 lead/5 tin solder, wetting occurs very quickly after the solder is melted, typically in the area of 315° to 320° C. As will be appreciated by one skilled in the art, the flux must be present in an amount to completely cover the solder joint which is generated. It is the intimacy of contact between molten solder and liquid flux which reduces the solder surface tension and permits molten solder to spontaneously wet the metallic substrate, thus producing a good solder bond.

The high boiling point monomeric organic compounds should have boiling points of 150° C. or greater, and, as indicated, these compounds should distill without undergoing any chemical change, or reacting chemically in situ so as to leave a residue. The upper boiling point is not limited, but we often find such compounds do not have a boiling point substantially in excess of about 320° C.

It is a further requirement that the high boiling point monomeric organic compounds of the present invention should not substantially evaporate prior to melting of the solder or braze paste and, of course, the TDPs per the present invention should not substantially be depolymerized prior to melting of the solder or braze flux. Of course, the liquid flux must wet the surface of the substrate(s) being soldered or brazed.

Useful high boiling monomeric organic compounds include materials comprising carbon/hydrogen/oxygen, and such should be free of substantial proportions of other elements such as lead to residue formation, e.g., halogens, sulfur, etc.

Preferred high boiling monomeric compounds useful herein include dihydroabietyl phthalate, glycerol, cis-1,3-docosenoic acid, stearic acid, 4-methoxybenzophenone, dihydrobenzophenone and diphenyloxazole.

The thermally depolymerizable polymers of the present invention preferably have a molecular weight of from about 500 to about 50,000, calculated by the intrinsic viscosity method. Unless otherwise indicated, all molecular weights are hereafter calculated by this method. The molecular weight of the polymer is determined by the desired physical properties of the polymer. Lower molecular weight polymers have greater solubility in organic solvents and have better flow properties at elevated temperatures. The fluxes of the present invention have been used as a "glue" to hold a chip to a substrate in transit prior to actual chip joining. As such the flux must be viscous enough to provide for good adhesion, but not too viscous at solder reflow temperatures so as to interfere with the spontaneous self-alignment of chips onto the substrate metal matrix.

These polymers preferably have the general structure given below:

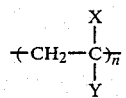

wherein X and Y are n-alkyl or iso-alkyl not exceeding 6 carbon atoms, halogen, COOR where R is n-alkyl or iso-alkyl not exceeding 6 carbon atoms, phenyl, naphthyl, tolyl or methylnaphthyl. Needless to say, X and Y need not be the same. Materials of varying tacticity are, of course, acceptable.

Moiety n typically varies from about 5 to about 500, but higher molecular weight materials can be used, e.g., TDPs with a molecular weight as high as 680,000 have been used with success, and if a particular situation requires higher polymeric properties such as strength, etc., such can be used in the present invention. We have noted the trend that as molecular weight increases, the depolymerization temperature decreases. Thus, where a lower depolymerization temperature is needed, it appears molecular weights of on the order of 700,000 can be contemplated.

A most preferred high boiling point monomeric organic compound utilized in the present invention is dihydroabietyl alcohol (hereinafter DABA) which is a monomeric, thermally stable compound of the formula:

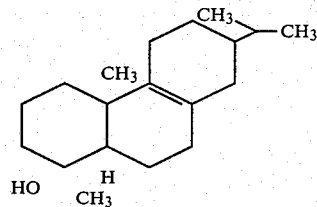

Most preferred thermally depolymerizable (unzippable) polymers include poly(alphamethylstyrene) of the formula:

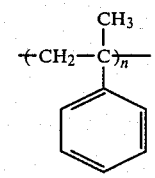

which preferably has an n value which provides a molecular weight of about 20,000, although higher molecular weight materials have been used successfully.

A further most preferred thermally depolymerizable polymer is polyisobutylene (hereinafter PIB), which when used with a molecular weight of 500, provides excellent results. With respect to the generic formula earlier advanced, groups X and Y are both CH$_3$. Higher molecular weight material has also been used successfully.

As earlier mentioned, the present invention is not limited to the use of TDPs or high boiling point monomeric organic compounds alone, rather, the present invention also contemplates using mixtures of such materials and, in certain instances, it is highly preferred to use such mixtures and, as earlier indicated, such mixtures are typically used for ease of TDP application where a non-fluid TDP is used. In this regard, there is no particular limitation on the amount of high boiling point monomeric organic compound with respect to the amount of low molecular weight thermally depolymerizable polymer. Thus, when the high boiling point monomeric organic compound is used as a vehicle to improve the ease of application of the TDP, only enough need be used to provide the TDP with a viscosity suited for application. While not limitative, often we use from about 5 to about 50 weight percent high boiling point monomeric organic compound(s) with respect to the weight of TDP(s).

For example, when DABA is used alone, attention must be given to the relatively low boiling point of DABA. When as much DABA as is desired can be introduced, then temperature considerations are not overly important. For example, when wafers upon which are attached lead-tin pads are being reflowed, excess DABA can be used, and loss of DABA through evaporation is not important.

On the other hand, in chip joining techniques where the chip is intimately mated to the substrate, the amount of DABA which can be introduced at the interface between the chip and the substrate is very limited, and in this instance it will often be preferred to use DABA with a TDP which will not depolymerize as rapidly as the DABA will distill off, whereby the desired fluxing effect is achieved, to thereby extend the time-temperature range.

A substantial advantage of using mixtures of one or more monomeric flux materials and one or more polymeric flux materials per the present invention is that such systems are considerably less volatile than the monomeric flux materials per se.

In many instances, however, it will be preferred to use the low boiling point monomeric organic compound and/or TDP of the present invention in combination with one or more solvents.

The main criteria which the solvent must exhibit is that it should not lead to phase separation of the flux during dissolution or use and it should not have an extremely low boiling point which might lead to very rapid volatilization and disrupt the soldering or brazing process.

Of course, the solvent should not leave any residue after its evaporation, but this is a problem which is seldom encountered with organic solvents as are typically used in the art unless impurities are present.

We most prefer, when using a high boiling point monomeric organic compound in combination with a TDP, to use two different solvents which evaporate off at different temperatures so that, for example, the first solvent initially evaporates, the second solvent then evaporates, the high boiling point monomeric organic compound then distills off and finally the TDP depolymerizes. For example, using an alcohol such as benzyl alcohol as a solvent for DABA and toluene as a solvent for poly(alphamethylstyrene), the solvents first come off, then the DABA and then the poly(alphamethylstyrene) depolymerizes, in this particular instance a four step removal of flux components being achieved.

There is no particular limit on the ratio of the high boiling point monomeric organic compounds and/or TDP to the organic solvent(s), but usually we prefer to use on the order of about 5 weight % to about 50 weight % solvent with respect to the sum of the weight of the low boiling point monomeric organic compound(s) and/or the TDP(s). Similar proportions of solvent(s) are used when the high boiling point monomeric organic compound or thermally depolymerizable polymer are used alone, i.e., not in combination. Higher amounts of solvent can, of course, be used. Preferred high boiling point organic solvents have a boiling point greater than about 100° C. but less than the boiling point of the high boiling point monomeric organic compound or the deploymerization temperature of the TDP.

Various additional flux material combinations useful per the present invention include DABA and glycerol, DABA and nonadecane, DABA and diphenyl oxazole, and the like.

Turning now to the temperature and time used for the soldering or brazing of the present invention, as will be apparent to one skilled in the art the exact temperature and time selected will depend upon the solder or braze used, the flux selected, the presence or absence of solvents and the metal substrate to be soldered or brazed and the particular restrictions provided by furnace heating profiles.

However, as will be apparent and has been discussed, in all instances the temperature of soldering must be one at which the solder is melted and the high boiling point monomeric organic compound is, after wetting, distilled off, and the TDP is depolymerized.

Usually temperatures on the order of about 280° C. to about 420° C. are used, and quite often temperatures no higher than about 375° C. are used with success.

In certain instances, lower temperatures can be used with success. For example, using DABA alone with an indium-tin solder, temperatures as low as 240° to 250° C. can be used with success.

On the other hand, assuming that a TDP alone is used, quite often it will be necessary to use temperatures on the order of 320° C. or higher to effect complete depolymerization.

Deploymerization may be initiated and/or augmented by the use of radiation (i.e. ultraviolet, X-ray, microwaves etc.), if desired.

As will be apparent to one skilled in the art, it is impossible to delineate an exact temperature range for all fluxes per the present invention, but one skilled in the art will easily be able to determine the best temperature to use based upon the individual system under consideration.

With respect to the heating rates used, these are determined in a conventional manner and depend upon the mass of the flux, solder and the capacity of the metal substrate to absorb heat. Heating rates can easily be determined by one skilled in the art.

Once the desired temperature of soldering or brazing is reached, this temperature is typically maintained to ensure complete solder wetting or spreading and to ensure removal of the components of the flux of the present invention.

As exemplary, where delicate electronic components are concerned typically melting of the solder or braze takes place within about 10 to 12 minutes, with flux removal being completed within an additional 4 to 6 minutes.

These times are in no fashion limitative, of course, and if laser joining were used, for example, melting occurs within a very short period of time, e.g., 15 seconds, with a very rapid removal of the flux components of the present invention, e.g., within a few seconds.

Radical inhibitors or accelerators may be added to the polymeric mixture to induct or accelerate the rate of polymer radical deploymerization provided that they have the requisite properties of vaporizing ultimately without leaving a permanent residue. It should be understood, of course, that such are not necessary to sucessfully practice the present invention.

As is the case with conventional soldering and brazing systems, the metal substrates to be soldered or brazed are cleaned prior to soldering or brazing in a conventional manner, and no novelty is attached to this particular aspect of the invention since it is well known in the art and conventional techniques can be used. Typically a conventional plasma cleaning is used, e.g., oxygen-argon plasma, though solvent cleaning using conventional solvents, e.g., a series of polar/non-polar solvents such as water, isopropanol and hexane can be practiced with equal success as can a combination of plasma cleaning and solvent cleaning.

We generally practice the soldering or brazing process of the present invention in an inert atmosphere as is conventional in the art, for example, nitrogen, argon and the like. The purpose of processing in an inert atmosphere is to avoid oxidation of the exposed metal substrate since oxidation kinetics are favored at high temperatures as are encountered in soldering or brazing.

An additional benefit of the fluxes of the present invention is that they are relatively insensitive to oxygen as compared to prior art materials such as rosin, i.e., the fluxes of the present invention are chemically stable in the presence of oxygen and, as compared to rosins as are used in the prior art, do not polymerize.

In the following discussion various exemplary preferred temperatures of use are recited; these are not to be construed as limitative as they are merely preferred.

One preferred flux formulation is DABA dissolved in benzyl alcohol. This is a monomeric, thermally stable flux and is often designed for lower temperature applications, e.g., on the order of 290° C. or less. Due to the relatively high volatility of benzyl alcohol, we consider this system a relatively low temperature flux.

DABA solutions in benzyl alcohol, e.g., a 26~31% DABA solution, have also been found to be extremely effective fluxes in promoting the wetting of 95–5% lead-tin solder onto clean nickel and gold surfaces when heated to 330° C. or even higher, e.g., 340°–360° C. Such a flux also provides superior results in brazing pins onto ceramic substrates at 400° to 450° C. with a paste of 80/20 gold-tin powder, providing the following benefits:

Shiny, clean fillets free of flux residue;
Minimum pin staining as compared to rosin fluxes;
Pull strength comparable to or better than achieved with rosin fluxes.

For moderate temperature applications, for example up to about 370° C., a flux formulation containing DABA and poly(alphamethylstyrene) as the TDP dissolved in toluene and benzyl alcohol, respectively, has proven to provide excellent results.

For example, a mixture of DABA and poly(alphamethylstyrene), equal parts dissolved in equal parts of benzyl alcohol and toluene, provides a flux where the solvents evaporated and then DABA rapidly vaporized at about 280° C. while the poly(alphamethylstyrene) was rapidly depolymerized at about 360° C. Such a flux was successfully used to wet an array of 95–5% lead-tin solder pads onto a matching array of gold surfaces supported on a ceramic module by heating for 5~6 minutes at 360° C.; the flux promoted excellent solder wetting and left no observable residue under microscopic evaluation. Various formulations where the poly(alphamethylstyrene) had molecular weights of from 20,000 to 680,000 were used with success.

For high temperature applications, e.g., up to about 430° C., or for applications in which a residual, passivating film is desired (in this latter instance the temperature should be no greater than about 380° C.) a flux formulation which comprises polyisobutylene as the TDP has proven to be successful; polyisobutylene may be used as it is or as a solution in toluene. Excellent results have been obtained in soldering with solders such as 95–5% lead-tin to nickel and gold surfaces and in joining quartz chips to MLC modules, i.e., multilayer ceramic modules, as are disclosed in, e.g., U.S. Pat. No. 4,221,047 Narken et al and IBM Technical Disclosure Bulletin, Vol. 23 No. 7A, December 1980, pages 2852 and 2853, both incorporated by reference.

For example, at 420°–460° C. for about 5 minutes polyisobutylene (500 average molecular weight) was an excellent solder flux for 95–5% lead-tin solder onto nickel and gold surfaces. No solvent was required since the low molecular weight polyisobutylene was sufficiently fluid; thermal depolymerization proceeded rapidly above 420° C. and no residue was noted. Below 420° C. this particular molecular weight polymer left a residual, conformal coating that was hydrophobic and inert which could be used as a passivating film and/or alpha particle barrier material. We have evaluated the alpha particle barrier properties of PIB and found them to be comparable to the current alpha particle barrier material which is a polysiloxane.

Higher molecular weight polyisobutylene could be applied as a solution, e.g., 50% polyisobutylene and 50% toluene.

Thus, when the heating cycle used in the present invention is shortened, fluxes of the present invention leave conformal coatings that are unaltered, inert films that can be used to passivate metallurgy. The TDP fluxes, in particular, can be used to provide such passivating films. If desired or necessary, the resulting films can be easily removed with conventional alcohol and-/or hydrocarbon solvents leaving no residual flux after drying in vacuo or by heating at or above the respective depolymerization temperatures. Since these materials leave no residue there is no limitation to the number of times that they may be re-worked, i.e., reused after solvent or thermal cleaning.

The fluxes of the present were tested using a system as described below which simulates wafer reflow and chip joining techniques.

A standard single zone 3 inch tube furnace three feet in length fitted with a quartz tube liner was used. The tube was fitted so as to introduce nitrogen from the left end of the tube while samples were introduced from the right side supported in a quartz sled (1 cm × 2.5 cm × 2.5 cm). The quartz sled was always preheated to minimize sample temperature rise time. The right side of the quartz tube was fitted with a tapered tube to permit venting of gas effluents to a hood. Samples were placed on the hot sled and heated as rapidly as possible to the desired temperature. The molten solder was allowed to resolidify at the cold end of the furnace while still under a nitrogen atmosphere (~100° C).

Thus, in an actual run small, clean, cylindrical plugs of 95%–5% lead-tin solder were placed into flat sections of clean nickel foil (10 mils thick) and supported on the quartz sled. The flux sample was placed dropwise over the solder and the entire assembly rapidly inserted into the furnace under a positive pressure of nitrogen. A thermocouple placed adjacent to the sample recorded the temperature during the fluxing-melting process. Visual observations were made during reflow and cool-down, and a semiquantitative measure of fluxing capacity was determined by measuring the contact angle made by the solidified solder and the nickel substrate. Effective wetting generally resulted in low contact angles, e.g., of the magnitude of 20°–40°.

Samples were further evaluated on a hot-stage apparatus in which samples to be chip-joined were placed on a copper block and heated under a metal coated glass cover under a nitrogen atmosphere (slight positive pressure). The glass cover was coated with metal except for a viewing window to reflect heat back into the chamber to simulate true furnace heating conditions. A microscope was positioned over the viewing hole to permit visual observation of the "chip" joining process. Thermocouples recorded the module surface temperature adjacent to the chip site as well as the copper block temperature. The assemblies were heated at a rate that simulates furnace reflow and joining conditions.

Transparent quartz "chips" with an array of vapor deposited 95%–5% Pb/Sn solder pads were coated with the flux using a camel hair brush and placed on single chip modules also coated with the flux. The "chip" was hand aligned under a microscope and off-set by 50% so that half of the gold surfaced base metallurgy (Cr/Cu/Au; Au rich) to which the chip was to be joined was visible. This permitted a better visual determination of the reflow temperature since silver solder could actually be observed coating the gold rich surface and permitted confirmation of chip self-alignment during joining, i.e., where a misaligned chip will "snap" into full alignment during reflow joining as a consequence of surface tension forces provided by the flux and molten metal. DABA, DABApoly(alphamethylstyrene) and polyisobutylene notably exhibited this self-alignment effect. Flux residues were evaluated visually (20× magnification) and by fluorescence and ultraviolet absorbance using lamps.

While the invention has been described in detail and with reference to specific embodiments thereof, it will be apparent to one skilled in the art that various changes and modifications can be made therein without departing from the spirit and scope thereof.

We claim:

1. In a soldering process for joining a plurality of metal components wherein a flux is employed to promote said process, the improvement which comprises the step of using a flux purified of impurities which might leave a residue, said flux consisting essentially of dihydroabietyl alcohol or dihydroabietyl alcohol and a member selected from the group consisting of thermally depolymerizable polymers having the structure:

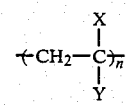

where X and Y are n-alkyl and iso-alkyl no exceeding 6 carbon atoms; halogen; —COOR where R is n-alkyl and iso-alkyl not exceeding 6 carbon atoms; phenyl, naphthyl, tolyl and methyl-naphthyl groups; n is 5 to 500, and mixtures thereof.

2. The process of claim 1 wherein said metal components comprise an integrated circuit component having solder contacts extending therefrom for solder connection to complimentary contact areas on at least one of a inorganic and organic substrate carrier.

3. The process of claim 2 wherein said carrier is an alumina substrate and said contact areas comprise nickel coated molybdenum metallurgy.

4. The process of claim 1 wherein the thermally depolymerizable polymer is poly(alphamethylstyrene).

5. The process of claim 1 wherein the thermally depolymerizable polymer is polyisobutylene.

6. A brazing paste comprising a metalliferious powder dispersed in a fugitive fluxing binder purified of impurities which might leave a residue, said fugitive fluxing binder consisting essentially of dihydroabietyl alcohol or dihydroabietyl alcohol and a member selected from the group consisting of thermally depolymerizable polymers having the structure:

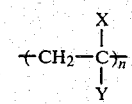

where X and Y are n-alkyl and iso-alkyl not exceeding 6 carbon atoms; halogen; —COOR where R is n-alkyl and iso-alkyl not exceeding 6 carbon atoms; phenyl, naphthyl, tolyl and methyl-naphthyl groups; n is 5 to 500, and mixtures thereof.

7. The brazing paste of claim 6 wherein said powder is selected from the group consisting of gold and gold/tin.

8. The brazing paste of claim 6 wherein the thermally depolymerizable polymer is poly(alphamethylstyrene).

9. The brazing paste of claim 6 wherein the thermally depolymerizable polymer is polyisobutylene.

10. A process for brazing metallic elements to nickel coated molybdenum metallurgy comprising brazing said element to said metallurgy with a brazing paste of a metalliferious powder dispersed in a fugitive fluxing binder purified of impurities which might leave residue, said fugitive fluxing binder consisting essentially of dihydroabietyl alcohol or dihydroabietyl alcohol and a member selected from the group consisting of thermally depolymerizable polymers having the structure:

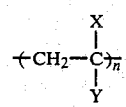

where X and Y are n-alkyl and iso-alkyl not exceeding 6 carbon atoms; halogen; —COOR where R is n-alkyl and iso-alkyl not exceeding 6 carbon atoms; phenyl, naphthyl, tolyl and methyl-naphthyl groups; n is 5 to 500, and mixtures thereof.

11. The process of claim 10 wherein said elements comprise contact pins and said metallurgy comprises contact areas extending from a conductor pattern of an alumina ceramic substrate.

12. The process of claim 10 wherein the thermally depolymerizable polymer is poly(alphamethylstyrene).

13. The process of claim 10 wherein the thermally depolymerizable polymer is polyisobutylene.

* * * * *

UNITED STATES PATENT AND TRADEMARK OFFICE
CERTIFICATE OF CORRECTION

PATENT NO. : 4,504,007
DATED : March 12, 1985
INVENTOR(S) : Herbert R. Anderson et al.

It is certified that error appears in the above-identified patent and that said Letters Patent is hereby corrected as shown below:

Claim 1, line 36   "no" should be --not--

Signed and Sealed this

Twenty-first Day of January 1986

[SEAL]

Attest:

DONALD J. QUIGG

Attesting Officer    Commissioner of Patents and Trademarks